(No Model.) 2 Sheets—Sheet 1.

J. O. WEST.
MACHINE FOR CUTTING CORN.

No. 303,771. Patented Aug. 19, 1884.

WITNESSES:
Fred. G. Dieterich.
Wm. Pecher.

John O. West,
INVENTOR.
By Louis Bagger & Co.
ATTORNEYS.

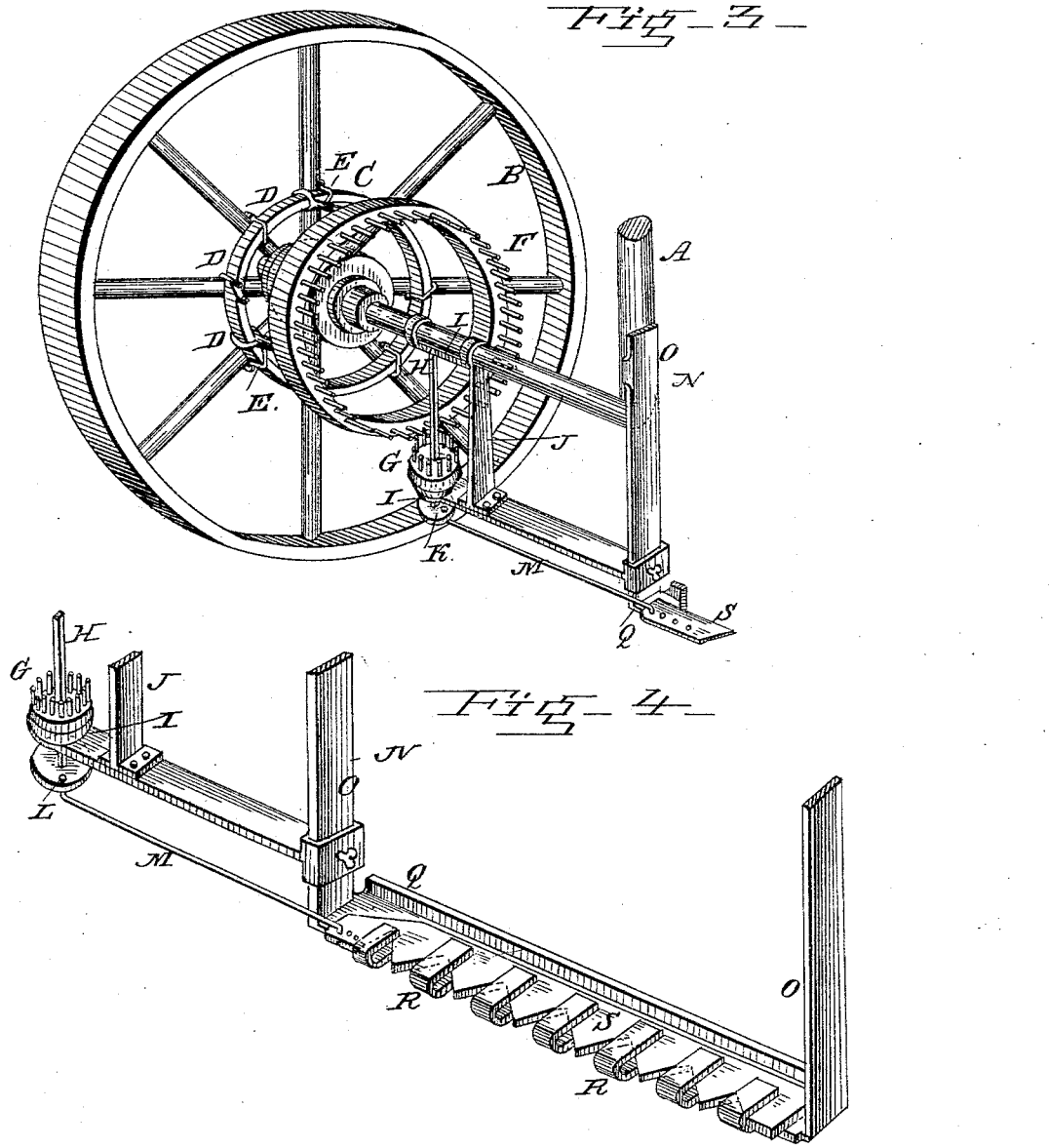

UNITED STATES PATENT OFFICE.

JOHN O. WEST, OF FULTON, KANSAS.

MACHINE FOR CUTTING CORN.

SPECIFICATION forming part of Letters Patent No. 303,771, dated August 19, 1884.

Application filed February 6, 1884. (No model.)

*To all whom it may concern:*

Be it known that I, JOHN O. WEST, a citizen of the United States, and a resident of Fulton, in the county of Bourbon and State of Kansas, have invented certain new and useful Improvements in Machines for Trimming or Cutting Corn; and I do hereby declare that the following is a full, clear, and exact description of the invention, which will enable others skilled in the art to which it appertains to make and use the same, reference being had to the accompanying drawings, which form a part of this specification, and in which—

Figure 1:
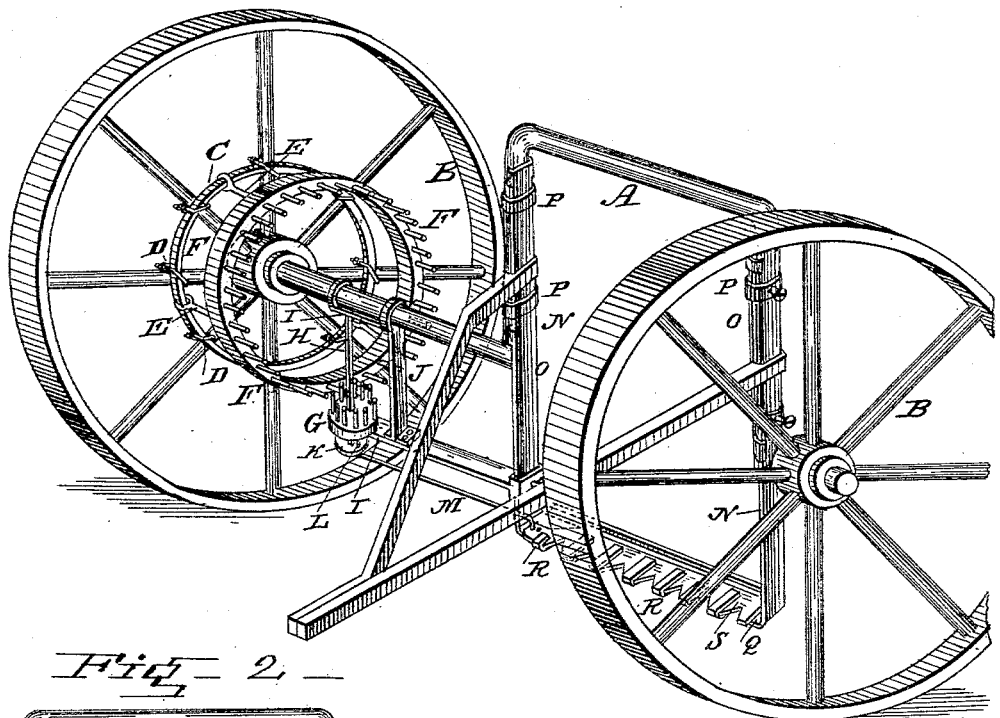
Figure 2:
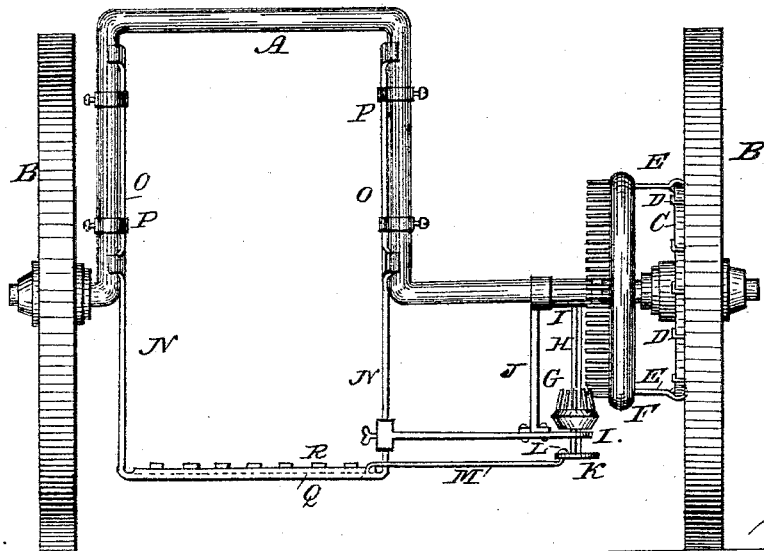

Figure 1 is a perspective view of my improved machine for cutting corn. Fig. 2 is a rear view of the same, and Figs. 3 and 4 are perspective detail views of the same.

Similar letters of reference indicate corresponding parts in all the figures.

My invention relates to machines for cutting corn or other plants; and it consists of the improved construction and combination of parts of a machine by means of which corn or other plants are cut off, and which is adapted to be fitted upon a common straddle-row cultivator-frame having an arched axle, as hereinafter more fully described and claimed.

In the accompanying drawings, the letter A indicates an arched or cranked axle, which may be that of a common straddle-row cultivator mounted on wheels B, to the spokes of one of which wheels a rim, C, is secured by clips D, which rim is provided with outwardly-projecting arms E, to the inner ends of which a crown-wheel rim, F, is secured. This crown-wheel rim meshes with a pinion, G, secured upon a vertical shaft, H, turning in bearings I in a frame, J, secured to the axle of the cultivator, the lower end of which shaft is provided with a disk, K, having a wrist-pin, L, to which one end of a pitman, M, is pivoted.

N is a three-sided frame, the vertical sides O of which slide upon the inner sides of the vertical portions of the bent or arched axle, being adjustably secured to the same by means of suitable clips, P, while the lower horizontal side, Q, of the frame is formed with a number of guard-fingers, R, doubled back upon themselves, and forming guideways for a cutter-bar, S, of the same construction as a usual harvester cutter-bar, to the end of which bar the end of the pitman is coupled. This cutter-bar serves, with the finger-bar, to cut the corn or other plants, and the frame being adjustable upon the vertical portion of the cranked axle the finger-bar may be raised or lowered, as desired, the pitman being adjustable at its coupling to the cutter-bar to conform to the different positions of the said bar.

Having thus described my invention, what I claim, and desire to secure by Letters Patent, is—

1. The combination, with a cranked or arched axle formed with vertical portions, of the finger-bar frame, consisting of vertical side pieces and a horizontal finger-bar connecting the lower ends of the side pieces, and having integral therewith guard-fingers doubled back upon themselves, and the clips for adjusting the side pieces of the finger-bar frame upon the vertical portions of the axle, as and for the purpose shown and set forth.

2. The combination of a bent axle formed with vertical portions, a pair of wheels turning upon the ends of the axle, a rim clipped to the spokes of one wheel and having inwardly-projecting arms provided with a crown-wheel rim upon their inner ends, a frame secured to one end of the axle and journal with vertical bearings, a shaft turning in the said bearings and having a pinion meshing with the crown-wheel rim, a crank-disk secured at the lower end of said shaft, a frame provided with vertical side pieces adjustably secured upon the inner sides of the vertical portions of the axle, a finger-bar forming the lower horizontal portion of the frame, a cutter-bar sliding in ways in said finger-bar, and a pitman pivoted at one end to the wrist-pin of the crank-disk and at the other end to the cutter-bar, all constructed as and for the purpose shown and set forth.

In testimony that I claim the foregoing as my own I have hereunto affixed my signature in presence of two witnesses.

JOHN O. WEST.

Witnesses:
JAMES R. STAPLETON,
FRANK W. FORRY.